(12) United States Patent
Larsen (10) Patent No.: US 7,016,489 B1
(45) Date of Patent: Mar. 21, 2006

(54) SYSTEM AND METHOD FOR PERFORMING ECHO CANCELLATION FOR NON-LINEARITIES

(75) Inventor: Frode Larsen, Tinton Falls, NJ (US)

(73) Assignee: Globespan, Inc., Red Bank, NJ (US)

(*) Notice: Subject to any disclaimer, the term of this patent is extended or adjusted under 35 U.S.C. 154(b) by 776 days.

(21) Appl. No.: 10/021,591

(22) Filed: Oct. 30, 2001

Related U.S. Application Data (60) Provisional application No. 60/260,132, filed on Jan. 2, 2001.

(51) Int. Cl.
*H04M 1/00* (2006.01)
*H04M 9/00* (2006.01)
*H04M 9/08* (2006.01)

(52) U.S. Cl. .............................. 379/406.06; 379/406.08

(58) Field of Classification Search ................ 375/220, 375/222; 370/286, 287; 379/406.01–406.16; 381/71.11

See application file for complete search history.

(56) References Cited

U.S. PATENT DOCUMENTS

| 3,647,992 A | * | 3/1972 | Thomas | 379/406.08 |
| 6,226,322 B1 | * | 5/2001 | Mukherjee | 375/229 |
| 6,765,967 B1 | * | 7/2004 | Dowling | 375/254 |

* cited by examiner

*Primary Examiner*—Curtis Kuntz
*Assistant Examiner*—Alexander Jamal
(74) *Attorney, Agent, or Firm*—Thomas, Kayden, Horstemeyer & Risley (57) ABSTRACT

A system for performing echo cancellation via use of a transceiver interface circuit. In a simplified embodiment, a digital signal processor (DSP), an analog front end (AFE), a line driver, and a hybrid network are located within the circuit. The DSP is configured to process a transmit, receive, and a transmit error signal. Mathematical operations of the DSP eliminate error from the receive signal with the help of the transmit error signal. The AFE modifies the transmit, receive, and transmit error signal from analog to digital or vice-versa. The line driver amplifies the transmit signal to a power level compatible with a transmission network. The line driver further produces the transmit error signal which is created by the amplification of the transmit signal. The hybrid network receives the amplified transmit signal from the AFE and a receive signal from the transmission network, and isolates the transmit signal from the receive signal. The receive signal, which has become infected with error from the hybrid network is passed, via the AFE, to the DSP for error compensation.

25 Claims, 7 Drawing Sheets

SYSTEM AND METHOD FOR PERFORMING ECHO CANCELLATION FOR NON-LINEARITIES

CROSS-REFERENCE TO RELATED APPLICATIONS

This application claims the benefit of U.S. Provisional Application Ser. No. 60/260,132, filed on Jan. 2, 2001 and entitled "A Simple Approach to Non-Linear Cancellation of Line Driver Errors and Non-Linearities," which is incorporated by reference herein in its entirety.

FIELD OF THE INVENTION

The present invention generally relates to telecommunication and, more particularly, relates to a system and method for removing the linear and non-linear echo signal.

BACKGROUND OF THE INVENTION

With advancements in technology, the transmission of voice and data at faster rates and in larger volumes is always in demand. One solution to fulfilling these demands is digital subscriber line (DSL) technology. DSL technology has been introduced into the field of broadband networking, among other reasons, to overcome issues faced by traditional voice band technology. Such issues include, but are not limited to, bandwidth limitations. Multiple DSL technologies exist including, but not limited to, rate adaptive DSL (RADSL), symmetric DSL (SDSL), multi-rate SDSL (M/SDSL), high bit-rate DSL (HDSL), very high bit-rate DSL (VDSL), and asymmetric DSL (ADSL).

ADSL technology utilizes the infrastructure already in place in a public switched telephone network (PSTN), including copper loops constructed of copper wires, between a customer premise and a central office. Advantageously, ADSL technology does not require replacement of network equipment such as routers, switches, firewalls and Web servers, which are commonly used in today's paradigm for broadband access.

The transmitting and receiving of information on a common wire creates coupling and interference between the transmitted and received signal. This interference is referred to as echo. One of the characteristics of echo is that a transmit waveform that is transmitted within a local transmit path, is coupled to a local receive path, thereby interfering with received signals. The result of this reflection is a differently shaped waveform than was originally intended to be received, which introduces data degradation.

Echo cancellation is the elimination of the transmit signal from the received signal. Numerous methods have been used for removing transmit echo. One such method, for example, comprises use of a least mean squared adaptation. Least mean squared adaptation finds a correlation between a received signal and error caused by echo. Specifically, an echo canceler is utilized to cancel transmit echo, thereby leaving a clean incoming signal.

The echo is generated by two types of error, linear error as well as non-linear error. Many of today's current applications can correct for the linear error. Digital Signal Processors (DSP) can easily detect the differences between the receive signal and the transmit signal it sent as long as the differences are linear. If the differences can be detected, an echo canceler can easily eliminate the error. However, DSPs can not easily recognize non-linear error.

Non-linear errors are caused by non-linearities present in components that process the transmit and receive signals. In particular, a line driver generates much of the non-linear error on the transmit signal. A line driver drives the transmit signal through a two-wire pair in accordance with a required power particular to the application considered and the type of line driven. Most established DSL applications have a required standard power spectral density template that they are required to meet. As an example, for the most common DSL service currently deployed (2B1Q HDSL), the required transmit power is approximately 13.5 dBm. This yields a maximum peak power of 18.6 dBm, for a peak current of 48.2 mA (assuming 6Vpp differential output voltage, 3 dB loss in back matching resistors, and a peak-to-average ratio (PAR) of 1.8 for 2B1Q).

At the other extreme, the required transmit power for a Discrete Multi Tone-Asymmetric Digital Subscriber Line-Central Office (DMT-ADSL-CO), assuming 3 dB loss in the back matching resistors and a PAR of 5.3 for DMT, is approximately 20.5 dBm. This yields a maximum peak power of 37.98 dBm, for a peak current of 2095 mA (assuming a 6Vpp differential output voltage). It should be noted that there is a multitude of other applications at various power levels between these two extremes. Also, due to line impairment caused by a variety of different factors, particularly bridge taps, the actual line impedance might be significantly less then expected, and the load current can thus be significantly higher then expected.

For DSL systems, the line driver is typically the most significant source of distortion in the data transmit path, due to the high speed and large load current requirement, combined with the variety of line configurations encountered. For most high-speed ADSL applications the trend is currently to avoid transmitting and receiving in the same frequency bands. From the customer premise side, typically there is transmission at the low frequency end of the band and reception at the upper frequency end of the band. Thus, distortion products, which fall at multiples of the transmit signal, fall in the receive spectrum. Typically, distortion in the transmit path couples into the receive path through a hybrid, which makes the receiver implementation significantly more challenging. The receiver recovers the echoed portion of the transmit signal, which falls in the receive band, as well as the receive signal itself. Therefore, limitation of distortion in the transmit path is important to both the transmission and reception of information.

It should also be noted, that distortion introduced in the receive band by any element in the transmit path, up to the line driver, can be filtered out with a passive external LC filter before it is fed to the line driver. However, if the line driver introduces the distortion, it is not practical to filter the distortion out due to the low impedance level. Thus, the distortion introduced by the line driver is the final limiting factor for the distortion of the transmit path, which typically is the most critical factor in terms of achievable reach of the system.

Generally, line drivers are implemented with high input impedance amplifiers. This makes it easy to interface to the line driver. However, it implies that there is significant signal swing across the input terminals of the line driver. This changes the common mode input to the line driver, which inherently changes the gain, in turn, yielding distortion and degradation of both transmitted and received data.

A system and method is desirable to not only eliminate the linear errors that crossover from the transmit path to the receive path, but to also eliminate non-linear errors generated by components that process the transmit signal. In particular, the errors caused by the line driver.

SUMMARY OF THE INVENTION

In light of the foregoing, a transceiver interface circuit is disclosed. The transceiver interface circuit cancels echo caused by non-linearities in the transmission and reception process.

Generally, the structure of the transceiver interface circuit contains a digital signal processor (DSP). The DSP processes a transmit, receive, and transmit error signal. Mathematical operations are performed on the receive and transmit error signal to eliminate non-linear error on the receive signal by error compensation. An analog front end (AFE) is used to modify the transmit, receive, and transmit error signals from either analog to digital or vice-versa. A line driver is used to amplify the transmit signal for transmission. The line driver also outputs the transmit error signal that is generated by the amplification of the transmit signal. A hybrid network is used to isolate the amplified transmit signal from the receive signal. The hybrid network sends the transmit signal and receives the receive signal to and from a transmission line, respectively. The receive signal and error signal are sent to the DSP for error compensation.

The present invention can also be viewed as a method for performing echo-cancellation. In this regard, the method can be broadly summarized by the following steps: amplifying a transmit signal to a certain power level for transmission; sensing a transmit error signal generated by the amplification of the transmit signal; error compensating a receive signal with the transmit error signal. The receive signal contains error that is introduced from the transmit signal. Once error compensated, transmit error is removed from the receive signal.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE INVENTION

Figure 1:
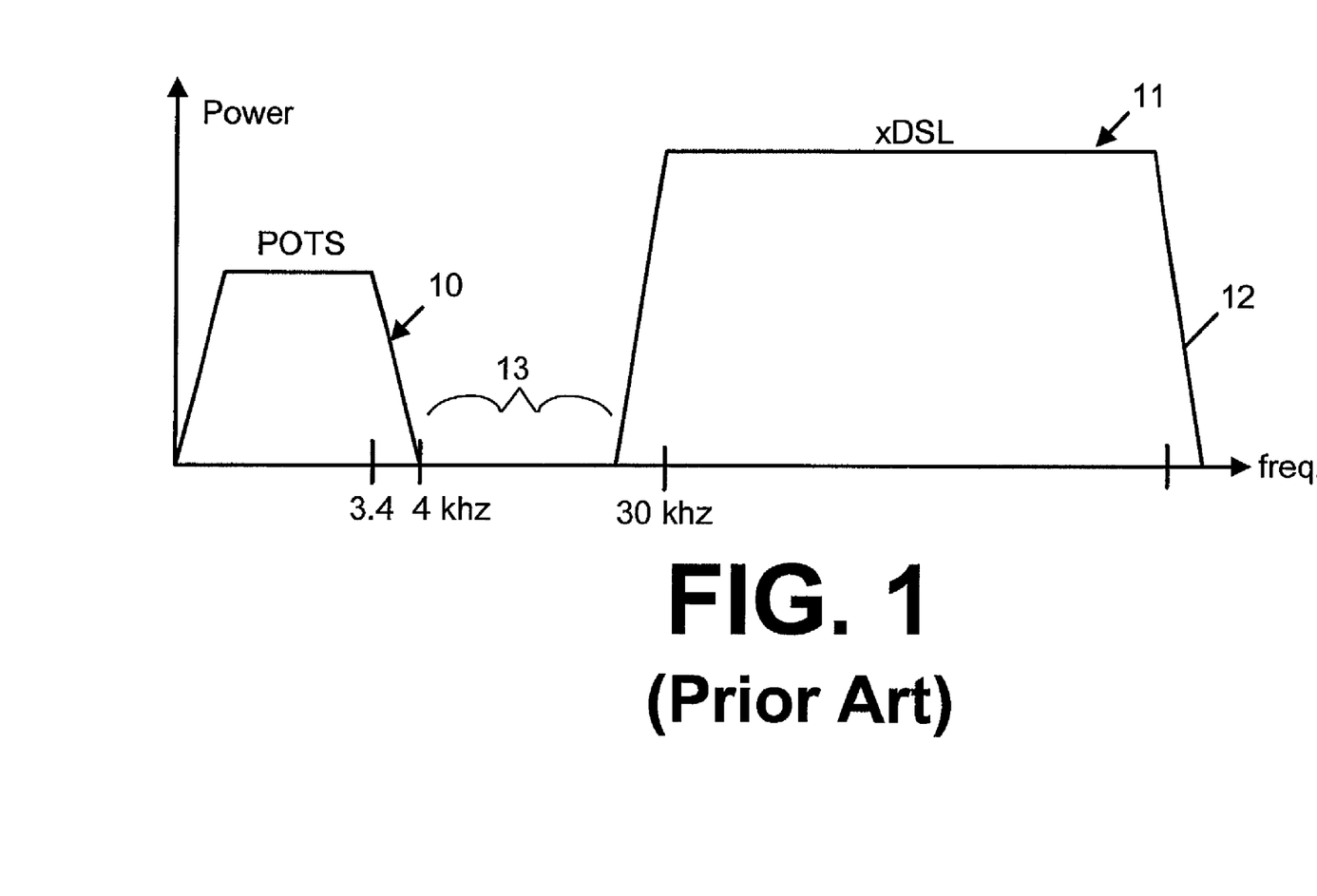
FIG. 1 shows the spectrum allocation for both POTS and xDSL signals.

Turning now to the drawings, wherein like referenced numerals designate corresponding parts throughout the drawings, FIG. 1 shows the spectrum allocation for both POTS and xDSL signals. Specifically, the graph is a plot of frequency on the horizontal axis and power on the vertical axis. As is known, the POTS frequency band 10 generally extends from approximately DC, or 0 hertz, to approximately 3.4 kilohertz. The xDSL frequency band 11 generally extends from approximately 30 kilohertz up to an upper boundary 12, which varies depending upon the particular digital subscriber line technology utilized. A separation or guard band 13 provides a margin of signal separation between the POTS frequency band and the xDSL frequency band, thereby allowing both POTS and xDSL to co-exist on the same wire.

Figure 2:
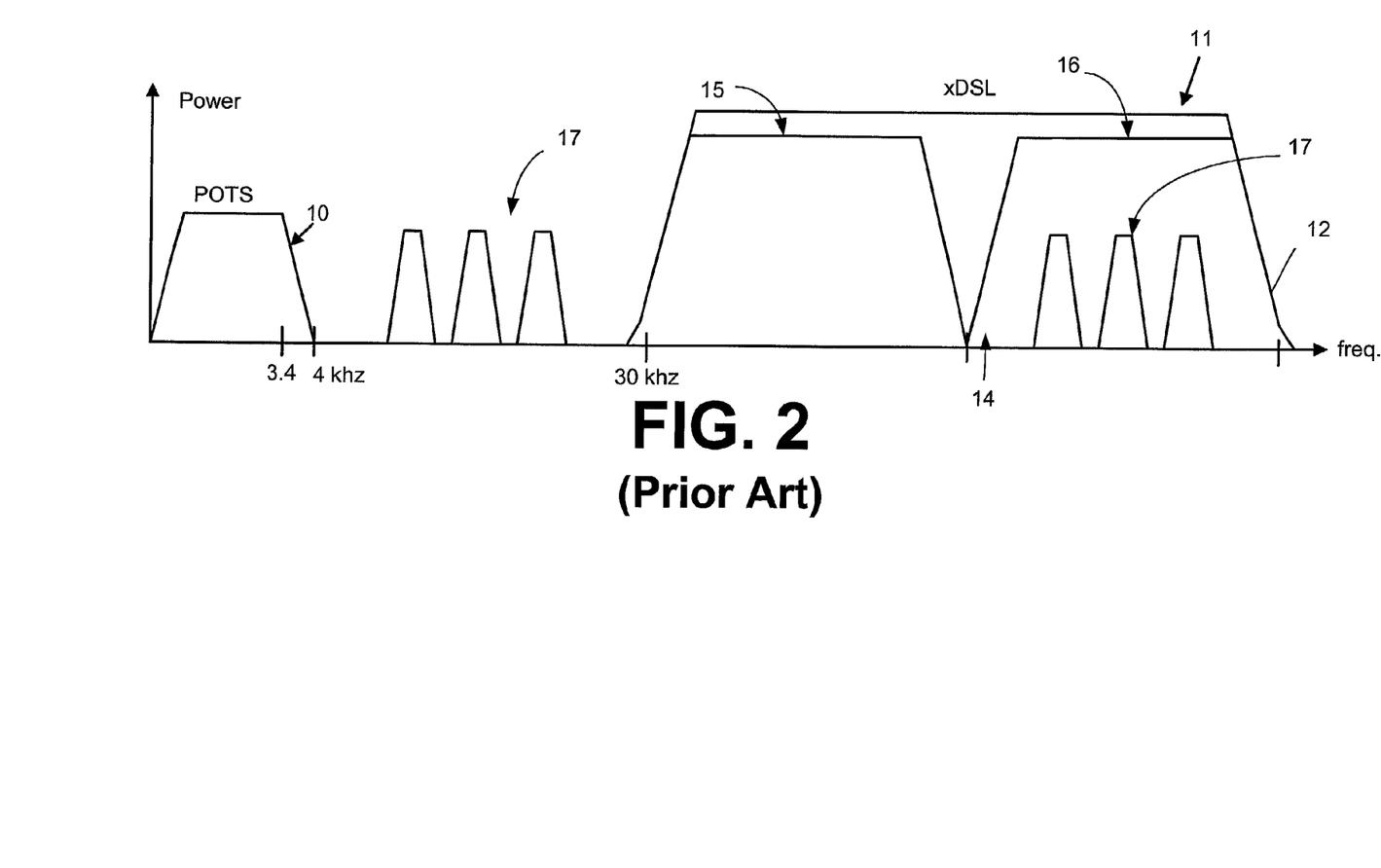
FIG. 2 shows the spectrum allocation for the transmit and receive signals of xDSL.

FIG. 2 shows in more detail the spectrum allocation of the xDSL frequency band 11. Again, the graph is a plot of frequency on the horizontal axis and power on the vertical axis. For customer premise applications the transmit signal frequency band 15 is the lower of the two 15 and 16. The transmit signal frequency band for ADSL is roughly 35 kHz to 135 kHz. The receive signal frequency band is roughly 138 kHz to 1.1 MHz. The upper and lower bounds of each frequency band may vary based upon the particular DSL technology utilized. On the central office side, the frequency bands are flipped. Therefore the transmit signal is in the higher frequency band and the receive signal is on the lower frequency band.

Of importance is the noise 17 which may be introduced at multiples of the transmit signal, i.e., at frequency multiples of the lower frequency band 15. This typically occurs as the transmit signal is processed by several components. As will be discussed later, amplification of the transmit signal is often the main cause of this error. As one can see, the noise 17 falls into the receive signal frequency band 16. When the two frequency bands become isolated by a hybrid network, the noise 17 that is in the receive signal does not get eliminated. It is this error that causes deterioration of the receive signal and thus must be corrected.

Figure 3:
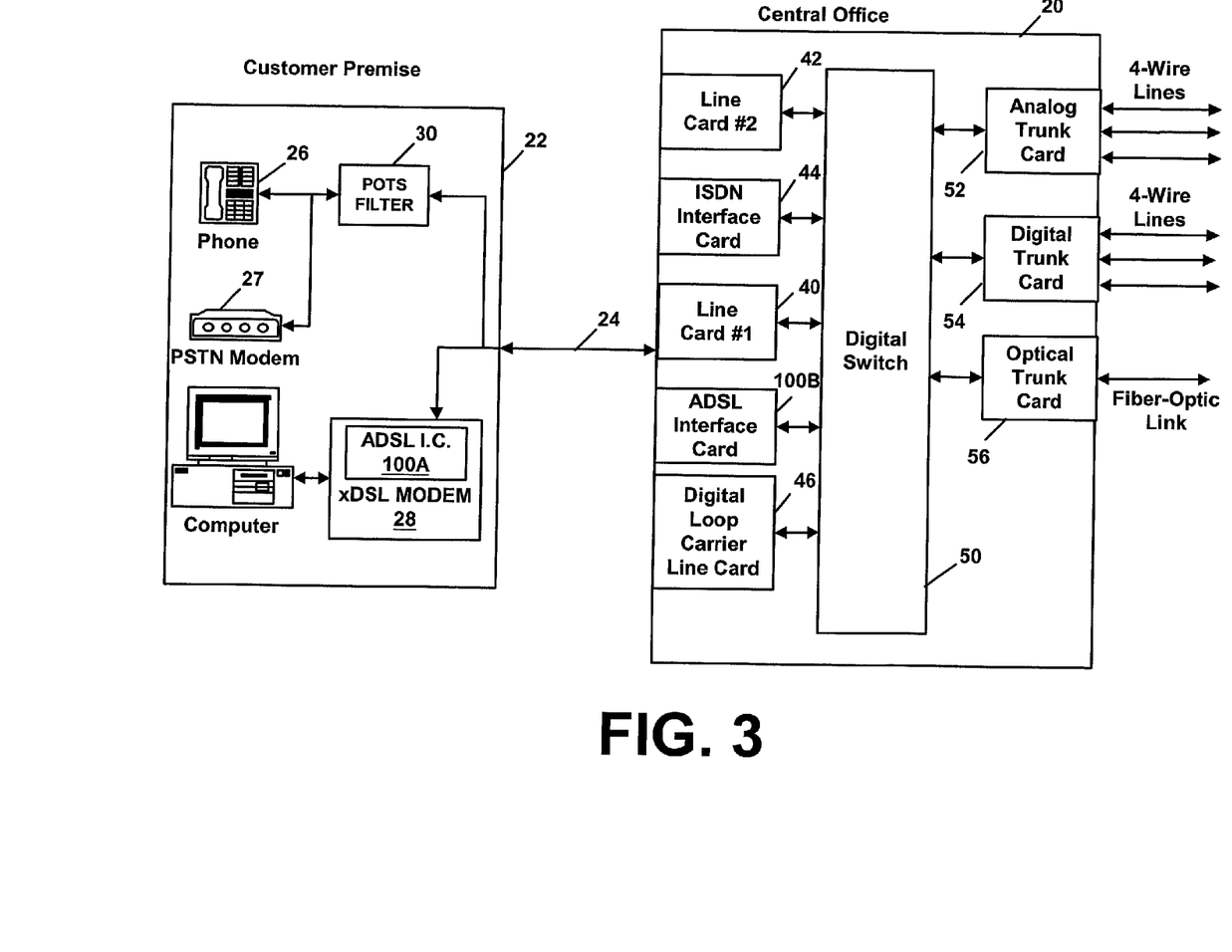
FIG. 3 is a block diagram of a communication system in which the present echo canceling system may be provided.

FIG. 3 is a block diagram of a communication system in which the present echo canceling system may be provided. Specifically, FIG. 3 illustrates communication between a central office 20 and a customer premise 22 by way of a local loop 24. While the customer premise 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28, comprising an ADSL interface card 100A for handling ADSL services. When an xDSL service is provided, such as, but not limited to, ADSL, a POTS filter 30 is interposed between the POTS equipment 26 and the local loop 24. As is known, the POTS filter 30 includes a low-pass filter having a cut-off frequency of approximately 4 kilohertz to approximately 10 kilohertz, in order to filter high frequency transmissions from the xDSL communication device 28 and protect the POTS equipment.

It should be noted that although the present disclosure is made with reference to ADSL technology, one skilled in the art will appreciate that other communication, specifically xDSL, technologies requiring the mitigation of echo effects may also be provided for by the present technique.

Additional circuitry is provided at the central office 20. Generally, a line card 40 containing line interface circuitry is provided for electrical connection to the local loop 24. In fact, multiple line cards may be provided 40, 42 to serve as a plurality of local loops 24. In the same way, additional circuit cards are typically provided at the central office 20 to handle different types of services. For example, an integrated services digital network (ISDN) interface card 44, a digital loop carrier line card 46, and other circuit cards, for supporting similar and other communication services, may be provided. Particular to the present echo canceling system, an ADSL interface card 100A may also be provided at the customer premise 22, also for handling ADSL services, as is further illustrated by FIG. 5. It should be noted that the ADSL interface card 100A may alternatively be located exclusively at the central office 20, or exclusively at the customer premise 22.

A digital switch 50 is also provided at the central office 20 and is disposed for communication with each of the various line cards 40, 42, 44, 46, 100B. On the outgoing side of the central office 20 (i.e., the side opposite the various local loops), a plurality of trunk cards 52, 54, 56 are typically provided. For example, an analog trunk card 52, a digital trunk card 54, and an optical trunk card 56 are all illustrated in FIG. 3. Typically, these cards have outgoing lines that support numerous multiplexed transmissions and are typically destined for other central offices or long distance toll offices.

The preferred embodiment of the invention uses DMT line coding techniques, which provide multiple sub-channels for the transmission of information. ADSL uses multiple independent sub-channels for the transmission of information. As known by one skilled in the art, each sub-channel is modulated using quadrature amplitude modulation (QAM) and carries a number of bits per sub-channel. These bits are transmitted and received in groups, or symbols. Generally, 256 complex QAM symbols, which are associated with 256 independent sub-channels, are then converted using an Inverse Fast Fourier Transform (IFFT) yielding a 512 sample DMT symbol. In other words, IFFT maps each QAM symbol into orthogonal frequency bins producing the DMT symbol.

A cyclic prefix, comprising 32 samples, is further appended to the 512 samples of each DMT symbol. Briefly stated, the cyclic prefix is a guard space in the time domain that is located between neighboring transmit DMT symbols in order to preserve independence between the 256 sub-channels, thereby protecting against inter-symbol interference (ISI). Each DMT symbol is made of 544 digital samples (512 samples+32 cyclic prefix samples), which are then converted to an analog signal by an analog front end.

Figure 4:
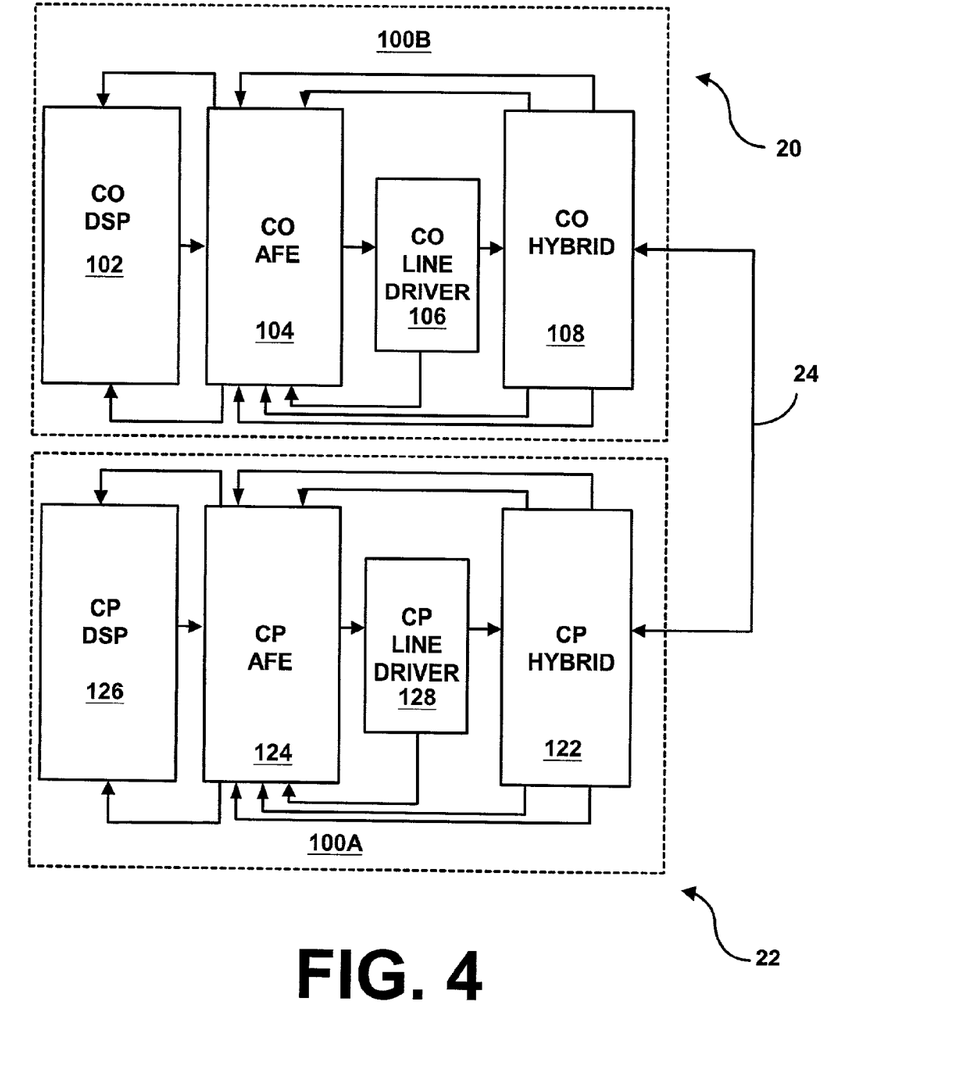
FIG. 4 is a block diagram further illustrating a connection between the central office ADSL interface card of FIG. 3 and the customer premise ADSL interface card of FIG. 3.

FIG. 4 is a block diagram further illustrating a connection between the ADSL interface card 100B of the central office 20 and the ADSL interface card 100A of the customer premise 22 (FIG. 3), wherein software would be provided within each ADSL interface card 100A, 100B for purposes of addressing the aforementioned echo problem. As shown by FIG. 4, with regard to the present illustration, transmission of data may be directed from the customer premise 22 to the central office 20, from the central office 20 to the customer premise (CP) 22, or in both directions at the same time. The ADSL interface card 100B located within the central office (CO) 20 comprises a CO DSP 102, which receives information from a data source (not shown) and sends information to a CO analog front end (AFE) 104. The CO AFE 104 interfaces between the local loop 24 and the CO DSP 102 and functions to convert digital data, from the CO DSP 102, into a continuous time analog signal.

The analog signal is delivered, via a CO line driver 106, in accordance with the amount of power required to drive the amplified analog signal through the local loop 24 and to the CP 22. A CP hybrid 122, located in the CP 22, is then used to de-couple the received signal from the transmitted signal, by subtracting the transmitted signal from the sum of the transmitted and received signals. A CP AFE 124, located in the CP 22, then converts the received analog signal into a digital signal, which is then transmitted to a CP DSP 126 located in the CP 22. The CP AFE 124 receives an error signal output from the CP line driver 128. The analog error signal is then converted from analog to digital by the CP AFE 124 and sent on to the CP DSP 126 for processing. The generation and processing of the error signal will further be discussed in FIG. 5. After residual echo cancellation is performed by the CP DSP 126, as is further discussed hereinbelow, the digital information is transmitted to the data source specified to receive the information.

If however, an analog signal is delivered from the CP 22 to the CO 20, a CP line driver 128 will deliver the signal in accordance with the amount of power required to drive the amplified analog signal through the local loop 24 and to the CO 20. A CO hybrid 108, located in the CO 20, is then used to de-couple the received signal from the transmitted signal, by subtracting the transmitted signal from the sum of the transmitted and received signal. The CO AFE 104, located in the CO 20, then converts the received analog signal into a digital signal, which is then transmitted to the CO DSP 102 located in the CO 20. The Co AFE 104 receives an error signal output from the CO line driver 106. The analog error signal is then converted from analog to digital by the CO AFE 104 and sent on to the CO DSP 102 for processing. Finally, after residual echo cancellation, the digital information is transmitted to the data source specified to receive the information.

Figure 5:
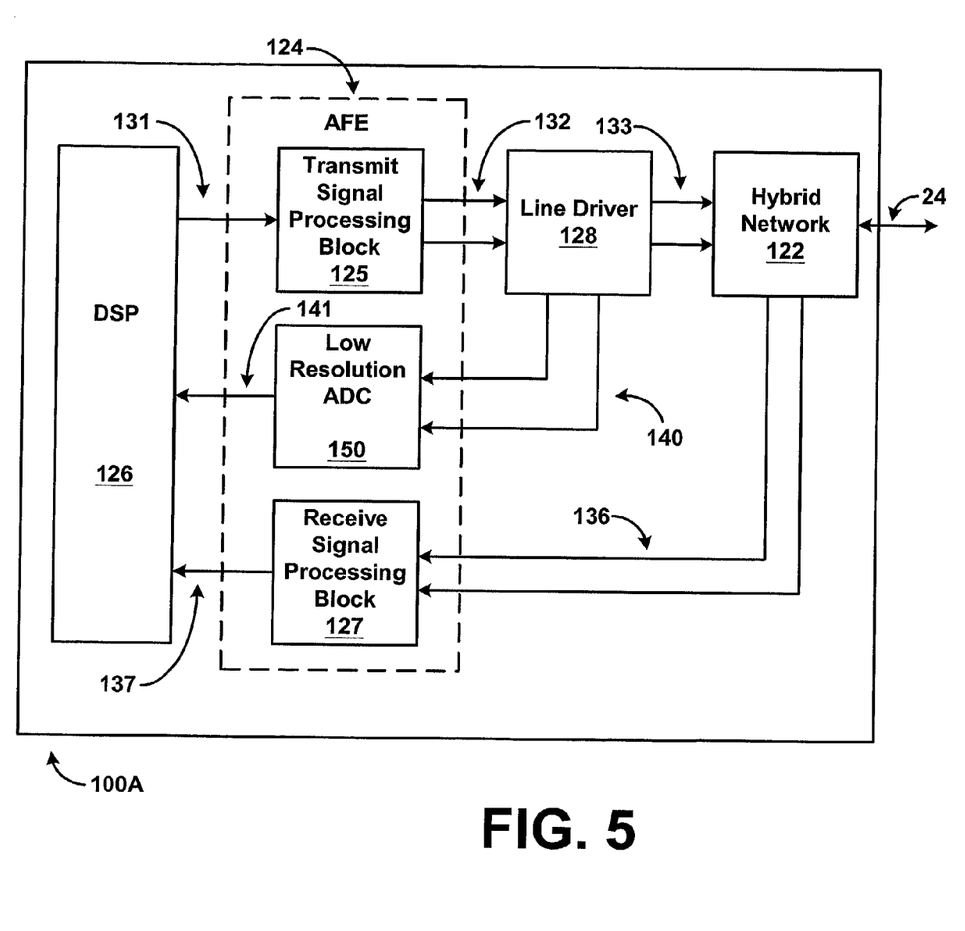
FIG. 5 is a block diagram further illustrating the ADSL customer premise interface card of FIG. 4.

FIG. 5 is a block diagram further illustrating the customer premise ADSL interface card 100A of FIG. 4. Again the DSP 126 receives information from a data source (not shown) that needs to be processed for communication. A digital transmit signal 131 is sent to the AFE 124, wherein a processing block 125 converts the digital transmit signal 131 to analog. The processing block 125 may also contain a plurality of filters used to eliminate any out of band noise that may have been generated by the DSP 126 or the digital to analog conversion. An analog transmit signal 132 is then sent to the line driver 128. The line driver 128, as mentioned above, amplifies the analog transmit signal 132 to the required power level based upon the characteristics of the communication network and the application being used. The line driver 128 produces an amplified analog transmit signal 133 that is passed on to the hybrid network 122. The amplification of the transmit signal generates much error in the form of transmit distortion, manifesting itself as noise 17 in the receive band (see FIG. 2) at multiples of the frequency band of the transmit signal. An error signal 140 can be generated by the line driver 128 that contains the error information generated by the line driver. This transmit error is one of the components of the transmit echo. The transmit error includes non-linear and linear components.

As previously discussed, the hybrid network 122 de-couples the transmit signal from the receive signal by subtracting the transmit signal from the combination of the two. Unfortunately, the very nature of the hybrid network 122 allows the noise 17 carried on the amplified transmit signal 132 that falls within the receive signal frequency band 16 (FIG. 2) to be passed through as a component of the receive signal 136. The receive signal 136, as mentioned above, is sent to the DSP 126 via the AFE 124. The AFE may contain some gain stages as well as filters to further process the analog receive signal 136. The receive signal processing block 127 houses these filters as well as an analog to digital converter.

The error signal 140 generated by the line driver 128 is passed to the AFE 124 where it is converted from analog to digital. The preferred embodiment contains a relatively low resolution A-D converter 150 although an A-D converter with higher resolution would suffice. The error signal 140 is generally quite small relative to the transmit and receive signals and the DSP 126 does not require an extremely accurate digital error signal 141, thus the low resolution A-D converter 150, which is relatively small and low in cost. The digital error signal 141 is received by the DSP 126.

The DSP 126 can now perform echo cancellation on the receive signal 137. As is known to one skilled in the art, linear error echo cancellation can be performed without an input error signal 141. The DSP 126 recognizes what it sent as the transmit signal 131 and what it receives as the receive signal 137. The system already calculates the transfer function from the DSP 126 to the receive port and so can easily cancel the linear echo. This level of echo cancellation still may retain a receive signal with some of the noise crossed over from the transmit signal caused by non-linear error. The transmit error signal 141 contains such information. The transmit error signal 141 helps compensate for errors in the receive signal 137. Essentially, the error signal 141 contains all the noise information that must be subtracted from the receive signal 137 to produce an accurate reproduction of the receive signal without any non-linear error originating from the transmit signal. Thus linear and non-linear error is eliminated, completing the echo cancellation. It should be noted that a wide array of algorithms can be applied to mathematically combine the transmit error signal 141 with the receive signal 137 to generate an accurate reproduction of the receive signal.

That being said, the DSP 126 can be either configured through hardware, or programmed through software or firmware, or any combination herein, to perform the echo cancellation. In the preferred embodiment of the invention, which is intended to be a non-limiting example, a portion of the system is implemented in software that is executed by the DSP.

The software based portion of the echo canceling system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 6:
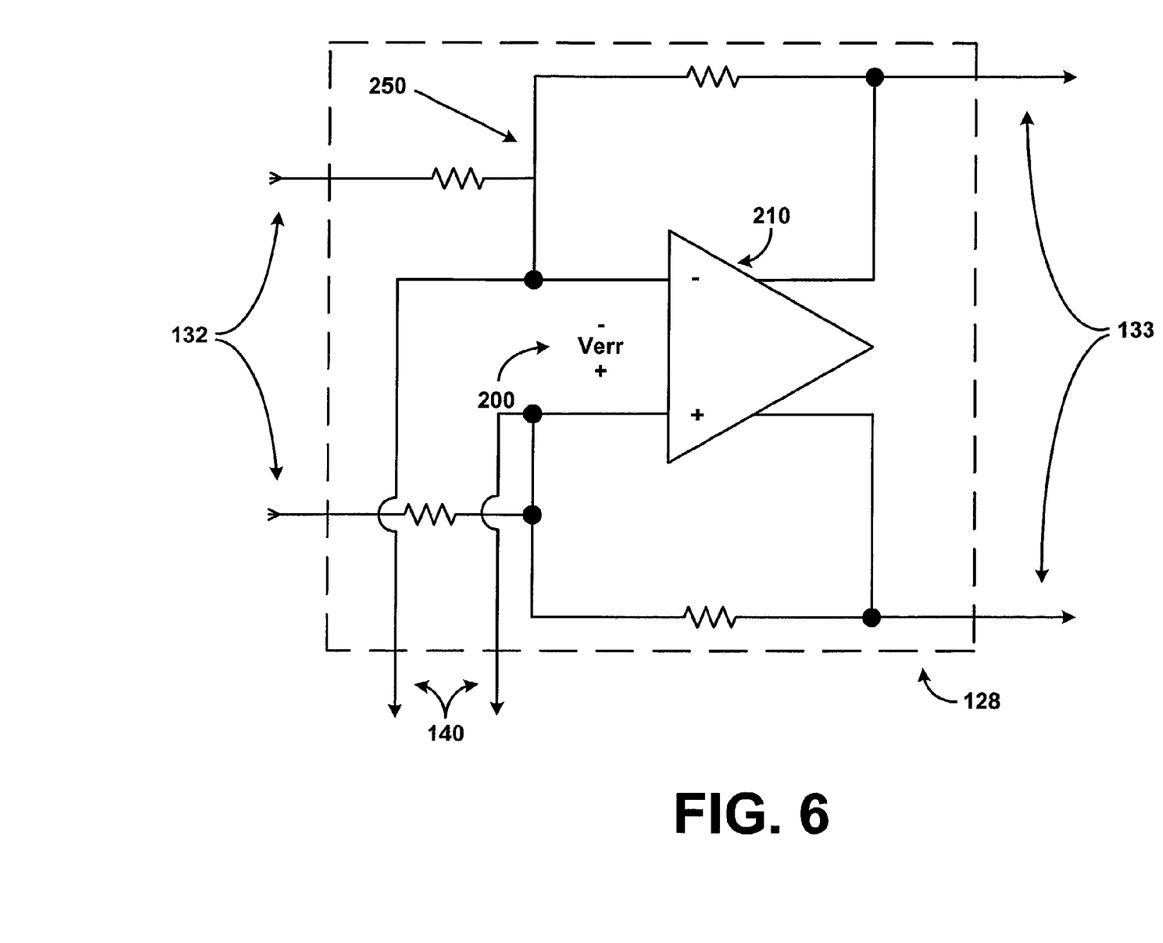
FIG. 6 is a circuit diagram of an amplifier contained within the line driver of FIG. 5.

Turning now to FIG. 6, an amplifier circuit of the line driver 128 of the preferred embodiment is shown. An inverting differential unity gain amplifier 250 is displayed to more easily show the process of generating an error signal through amplification. It should be noted that other amplifiers could be used to produce the same results of amplifying the transmit signal 132 and producing an error signal 140. An ideal operational amplifier (op-amp) 210 takes an input, amplifies the input $V_{in}$ by a gain and produces an output $V_{out}=AV_{in}$. An inverting amplifier will produce an output $V_{out}=-AV_{in}$ and a differential amplifier will produce an output based upon the difference between two inputs $V_{out}=A(V+-V-)$. A unity gain amplifier will produce an output that is equivalent in magnitude as the input (A=1), therefore $V_{out}=V_{in}$. So the inverting differential unity gain amplifier 250 will produce an output $V_{out}=-(V^+-V^-)$. In the case of the preferred embodiment, the input signals 132 coming from the AFE 124 are common mode, meaning like in magnitude, therefore the output of the amplifier $V_{out}=-V_{in}$. When feedback is present in the amplifier circuit and no current is flowing into the + and − terminals of the op-amp 210 it is said that a virtual ground 200 is formed. For an ideal amplifier, the virtual ground 200 means that the voltages across the input terminals are tied together and in this case $V_{in}^+$ is equal but opposite to $V_{in}^-$.

Unfortunately, amplifiers are non-ideal and they produce errors. These errors, as discussed earlier are carried on the amplified transmit signal 133 and introduced into the receive signal later on in the system. So the non-ideal inverting differential unity gain amplifier 250 will produce an output $V_{out}=-(V_{in})+V_{err}$, assuming $V_{in}$ is common mode, as is the case in the preferred embodiment. If any error, $V_{err}$, is produced by the amplifier 250, it can be pulled from the virtual ground 200. This can be seen by following the output signal back to the input side through the feedback. This error signal 140 is then fed from the virtual ground 200, out of the line driver 128, and processed by the low-resolution ADC 150 in the AFE 124 (FIG. 5).

Figure 7:
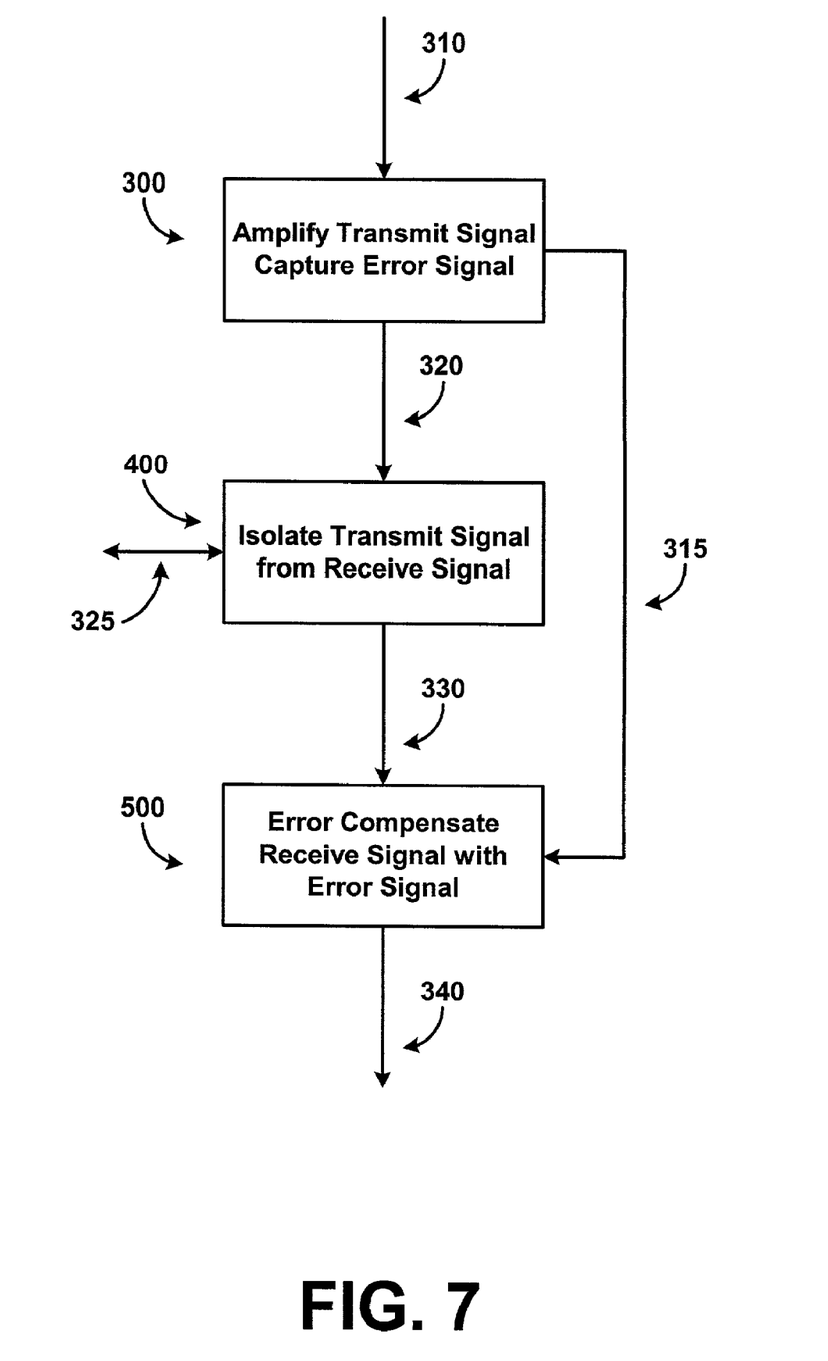
FIG. 7 is a flowchart illustrating functionality performed by the present echo canceling system.

FIG. 7 is a flowchart further illustrating the functionality of the present system. A transmit signal 310 is passed to an amplify stage 300. The transmit signal 310 is amplified to a specific power level based upon the transmission network. A transmit error signal 315 is produced by the amplify stage 300 that relates to the error produced by the amplification. In the preferred embodiment the amplify stage 300 is incorporated within the line driver. The amplified transmit signal 320 is passed to an isolation stage 400. A receive signal is received from an external transmission line 325. The external transmission line also carries the transmit signal. The isolation stage 400 attempts to isolate the transmit signal from the receive signal by de-coupling the receive signal from the combination of the two. In the preferred embodiment the isolation stage 400 is incorporated within the hybrid network. The receive signal 330 is passed on to a error compensation stage 500.

The error compensation stage 500 receives both the receive signal 330 and the transmit error signal 315. By one or a combination of several possible mathematical means the receive signal 330 is compensated. The error information of the transmit error signal 315 is "subtracted" from the receive signal 330 that contains the same error information. The compensation stage 500 produces an error eliminated receive signal 340. The echo caused by the communication system is thus eliminated.

It should be emphasized that the above described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A transceiver interface circuit configured to transmit and receive information, the circuit further configured to perform echo-cancellation, comprising:
   a digital signal processor (DSP) configured to digitally process information from a data source and to generate a transmit signal, the DSP further configured to receive and process a receive signal and a transmit error signal;
   an analog front end (AFE) coupled with the DSP, the AFE configured to modify the transmit signal, the receive signal, and the transmit error signal;
   a line driver coupled with the AFE, the line driver configured to amplify the modified transmit signal and to produce the transmit error signal; and
   where the line driver comprises an inverting differential unity gain amplifier and where said transmit error signal is produced directly from the differential virtual ground input of said amplifier; and
   a hybrid network coupled with the line driver and the AFE, the hybrid network configured to transmit, via a transmission line, the amplified transmit signal output from the line driver and to forward the receive signal received from the transmission line to the AFE, the hybrid network further configured to isolate the amplified transmit signal from the receive signal.

2. The circuit of claim 1, wherein the DSP is further configured to error compensate the receive signal by means of the transmit error signal.

3. The circuit of claim 2, wherein the error compensated receive signal comprises a reduced transmit signal component.

4. The circuit of claim 1, wherein the AFE further comprises:
   a digital to analog converter configured to convert the transmit signal from digital to analog;
   at least one filter to further prepare the transmit signal for transmission;
   at least one filter to further process the receive signal from transmission;
   a first analog to digital converter configured to convert the receive signal from analog to digital; and
   a second analog to digital converter configured to convert the transmit error signal from analog to digital.

5. The circuit of claim 1, wherein the line driver further comprises:
   a differential amplifier being configured to produce an amplified output signal from two common mode input signals; and
   a virtual ground wherein the transmit error signal is measured from.

6. The circuit of claim 5, wherein the differential amplifier is an inverting differential amplifier.

7. The circuit of claim 5, wherein the virtual ground is between inputs of the amplifier.

8. The interface circuit of claim 1, wherein the transmit error signal contains the non-linear error of the transmit signal.

9. A transceiver interface circuit comprising:
   means for digitally processing information from a data source and transmitting the information via a transmit signal, the digital signal processing means receiving and digitally processing a receive signal and a transmit error signal;
   means for converting an analog signal into a digital signal and converting a digital signal into an analog signal;
   means for amplifying the transmit signal for transmission via a transmission line, the amplification means producing a transmit error signal generated by the amplification of the transmit signal; and
   where the amplifying means comprises an inverting differential unity gain amplifier and where said transmit error signal is produced directly from the differential virtual ground input of said amplifier; and
   means for isolating the transmit signal from a receive signal received via a transmission.

10. The circuit of claim 9, further comprising:
    means for subtracting the transmit error signal from the receive signal to produce an error compensated receive signal.

11. The circuit of claim 9, wherein the amplification means further comprises:
    a differential amplifier configured to produce an amplified output signal from two common mode input signals; and
    a virtual ground wherein the transmit error signal is measured from.

12. The circuit of claim 11, wherein the differential amplifier is an inverting differential amplifier.

13. The circuit of claim 11, wherein the virtual ground is between inputs of the amplifier.

14. The circuit of claim 9, wherein the transmit error signal contains the non-linear error of the transmit signal.

15. A system for performing echo cancellation, comprising:
    a digital signal processor (DSP) configured to digitally process information from a data source and to transmit the information via a transmit signal, the DSP further configured to receive and digitally process a transmit error signal; and
    a line driver in communication with the DSP via an analog front end (AFE) and configured to amplify the transmit signal and to produce the transmit error signal that is delivered to the DSP via the AFE; and
    where the line driver comprises an inverting differential unity gain amplifier and where said transmit error signal is produced directly from the differential virtual ground input of said amplifier.

16. The system of claim 15, further comprising:
    a hybrid network coupled with the line driver and the AFE, configured to transmit, via a transmission line, the amplified transmit signal output from the line driver and to output a receive signal received from the transmission line to the AFE, the hybrid network further configured to isolate the amplified transit signal from the receive signal.

17. The system of claim 16, wherein the DSP is further configured to subtract the transmit error signal from the receive signal by an echo canceler, resulting in a clean received signal without echo.

18. The system of claim 16, wherein the AFE further comprises:
- a digital to analog converter configured to convert the transmit signal from digital to analog;
- at least one filter to further prepare the transmit signal for transmission;
- at least one filter to further process the receive signal from transmission;
- a first analog to digital converter configured to convert the receive signal from analog to digital; and
- a second analog to digital converter configured to convert the transmit error signal from analog to digital.

19. The system of claim 15, wherein the line driver further comprises:
- a differential amplifier being configured to produce an amplified output signal from two common mode input signals; and
- a virtual ground wherein the transmit error signal is measured from.

20. The system of claim 19, wherein the differential amplifier is an inverting differential amplifier.

21. The system of claim 19, wherein the virtual ground is between inputs of the amplifier.

22. The system of claim 15, wherein the transmit error signal contains the non-linear error of the transmit signal.

23. A method for performing echo cancellation, the method comprising the steps of:
- amplifying a transmit signal for transmission where the line driver comprises an inverting differential unity gain amplifier;
- sensing a transmit error signal generated by amplification of the transmit signal where said transmit error signal is produced directly from the differential virtual ground input of said amplifier;
- receiving and processing a receive signal with a digital signal processor, the receive signal comprising a combination of at least a remotely generated signal and the transmit error signal; and
- error compensating the receive signal by means of the transmit error signal.

24. The method of claim 23, further comprising:
- measuring the transmit error signal across a virtual ground, wherein the virtual ground is between inputs of the amplification means.

25. The method of claim 23, wherein the transmit error signal contains the non-linear error of the transmit signal.

* * * * *